March 29, 1949.  B. J. MILLS  2,465,910
LUNCH BOX
Filed April 27, 1945
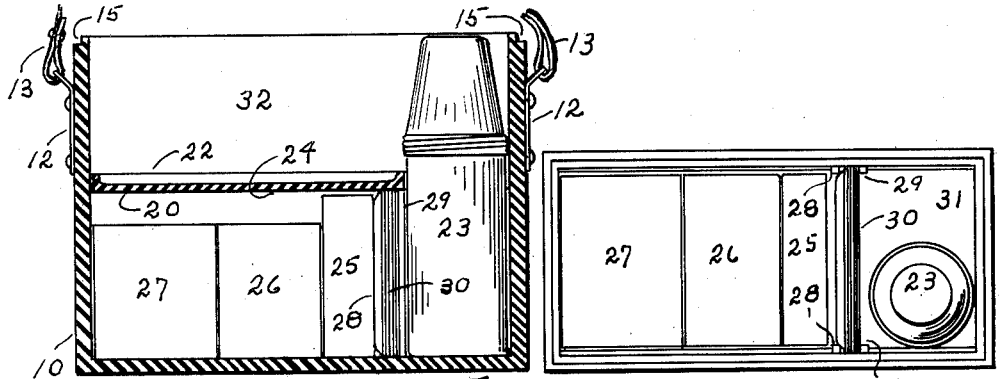
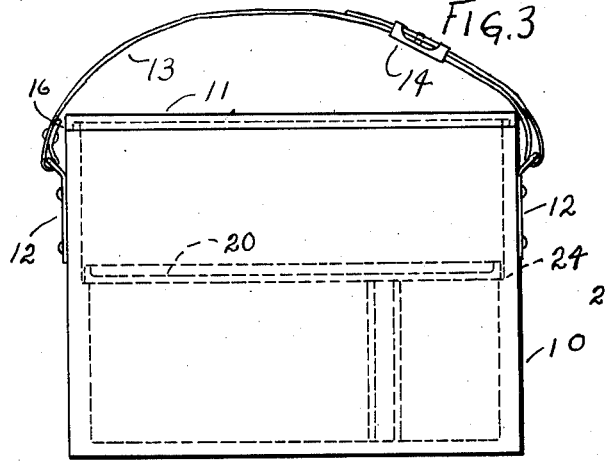
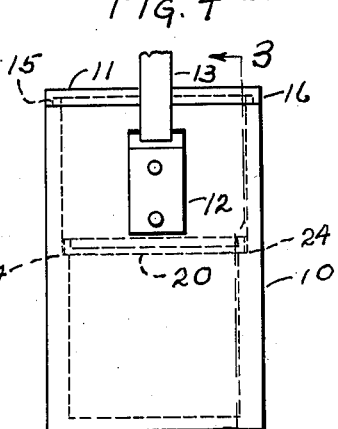
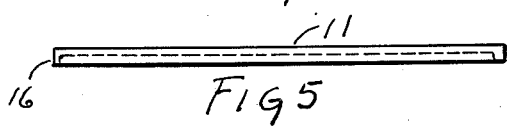
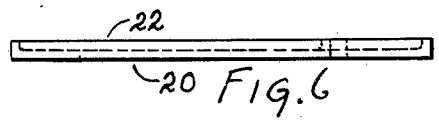
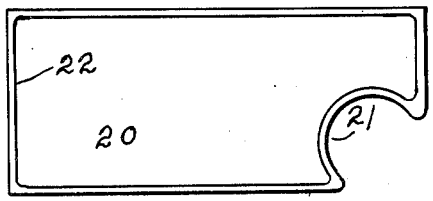
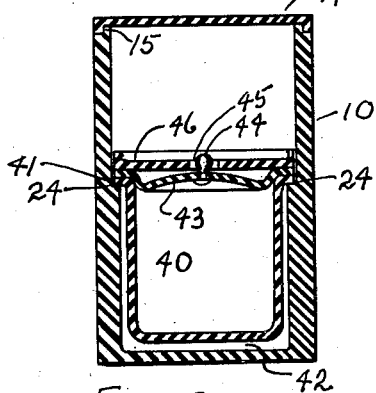
INVENTOR.
BERNARD J. MILLS
BY A.S.Kroh
ATTORNEY

UNITED STATES PATENT OFFICE 2,465,910

LUNCH BOX

Bernard J. Mills, Cudahy, Wis.

Application April 27, 1945, Serial No. 590,536

2 Claims. (Cl. 206—4)

The present invention relates to what is commonly called lunch baskets, but differing radically in structure from the ordinary lunch basket which is generally large enough for family picnic use and necessarily considerably larger than the ordinary lunch box as generally used by factory workmen.

Lunch baskets are carried about in the open and frequently exposed to wet grass, rain, insects and the sun's rays, thus the ordinary lunch basket is entirely unsuited for the purpose for which it is used.

The present invention is especially adapted for family lunches because the lunch is easily packed in the box, furthermore the box is water proof and to a considerable extent, heat resisting.

My improved lunch box is impervious to moisture. It is designed so it may be left in the rain without danger of exposing the contents to moisture. Receptacles are provided which are preferably moulded from synthetic material therefore easily cleaned and kept in a sanitary condition.

The present invention being made from moulded synthetic material is light, strong and inexpensive; therefore it may be said that my improved lunch box is an outstanding improvement in the art and can be manufactured in mass production so the selling price will be comparable to the old fashioned lunch basket as to price but far superior in every other respect.

To these and other useful ends my invention consists of parts, combinations of parts or their equivalents as hereinafter described and claimed and shown in the accompanying drawings in which:

Fig. 1 is a side elevational view of the preferred form of my improved lunch box.

Fig. 2 is an end view of the device as shown in Figure 1.

Fig. 3 is a sectional view taken on line 3—3 of Figure 2 and illustrating the removable partition, receptacles and Thermos bottle.

Fig. 4 is a top view of the assembly shown in Figure 3, less members 12 and 13.

Fig. 5 is an elevational view of the lid.

Fig. 6 is a side elevational view of the removable partition and Fig. 7 is a top view of the partition as shown in Figure 6.

Fig. 8 is a partially sectioned view of a modification of the lunch box.

In the drawings the main body of the box is designated by reference numeral 10 and the lid for the box is designated by numeral 11. On each end of the box I preferably secure brackets 12—12 to which the strap 13 is secured as illustrated; one end of the strap being looped and having a buckle 14 so the strap may be shortened or lengthened for carrying the box by hand or by placing the strap over the shoulder. It will be noted by scrutinizing the drawings that member 10 is offset as at 15, lid 11 having flanges 16 which fit into offset 15; thus overhanging flange 16 will form a suitable positioner for lid 11 and a means to prevent water from getting into the box if exposed to rain. I provide a horizontal partition 20 as shown in Figures 6 and 7 having preferably a curved opening 21 at one corner and upwardly extending flanges 22 which surround the outer portion of the partition. Opening 21 is adapted to receive a Thermos bottle 23 and hold this bottle into position. Partition 20 is adapted to lay on offset edges 24—24. I provide a receptacle 25 for silverware and the like and receptacles 26 and 27 for vegetables, meat, etc. Receptacles 25, 26 and 27 are held in position by means of strips 28—28, other strips 29—29 being positioned as shown in Figures 3 and 4 and being at a suitable distance from strips 28 so a number of paper dishes 30 may be inserted therebetween; thus after the parts have been placed in the lunch box as herebefore described there will be left a space 31 adjacent the Thermos bottle 23 and under partition 20 in which to pack napkins or other materials. It will be noted when the box is packed as illustrated in Figure 3 that a considerable space 32 is provided in which to pack sandwiches and the like. It will be understood that members 20, 25, 26 and 27 are preferably made from synthetic material.

It will be seen that the box, partition, and containers may be easily washed with soap water and kept clean and in a sanitary condition; that the containers and spaces 31 and 32 give the user an opportunity to pack a lunch suitable for any purpose and for any reasonable number of picnickers.

Referring now to Figure 8; in this figure the design of the container is similar to that shown in the other figures. However instead of container 27 I provide preferably container 40 having overhanging flanges 41 which lie on offset edges 24. This container being designed so there is a narrow air gap 42 around the bottom and sides of the container for further insulating against heat exchange.

I provide a lid 43 for member 40 the outer edges of which rest on flanges 41 and having preferably a conventional hand lifting piece 44 which extends through an opening 45 in partition 46. It will be understood that container 40 may be large enough to dispense with members 26 and 27 or be the size of either one of these members, the object of this design being to provide a metal receptacle for use over an open fire to reheat the food that may require heating.

Clearly my improved lunch basket will protect the food packed therein against insects, dust and water, even if left in the rain. Therefore it is ideal for the purpose for which it was devised.

Having thus shown and described my invention I claim:

1. A lunch box of the character described comprising; an open top container made from integrally moulded synthetics and being rectangular transversely and longitudinally, a lid for said container being moulded from synthetics and having downwardly extending flanges and adapted to snugly surround the top of and cover the container to prevent ingress of moisture, dust and insects, integrally formed ledges on the inner side walls of said container, and positioned near the vertical center thereof, a partition adapted to lie on said ledges and form bottom and top compartments in the container, said partition having a cutaway portion at one corner to thereby provide a space for a vertically positioned Thermos bottle, brackets secured to two of the walls of the container and a bail secured to the brackets adapted to answer as a carrying means for the box, spaced vertically positioned integrally formed projections extending from the bottom of the container to said ledges forming guiding means for plates and the like and positioned adjacent said cutaway portion, rectangular receptacles adapted to be placed side by side in the container below said partition and between the end wall of the container and said projections, said receptacles adapted to substantially fill the space formed by two of said projections, side walls and an end wall of the container.

2. A device as recited in claim 1 including, one of said last containers being formed from sheet metal and having outwardly extending flanges at its top adapted to rest on said ledges, and having means whereby the body of the container will be held a distance from the walls and bottom of the box, a lid adapted to act as a cover seal for the top of said last container.

BERNARD J. MILLS.

REFERENCES CITED

The following references are of record in the file of this patent:

UNITED STATES PATENTS

| Number | Name | Date |
| --- | --- | --- |
| 598,801 | Minter | Feb. 8, 1898 |
| 967,865 | Ward | Aug. 16, 1910 |
| 1,462,674 | White | July 24, 1923 |
| 1,546,254 | Rotzell | July 14, 1925 |
| 1,650,980 | Campbell | Nov. 29, 1927 |
| 1,730,403 | Boland | Oct. 8, 1929 |
| 1,773,663 | Dickens | Aug. 19, 1930 |
| 1,907,187 | Pierce | May 2, 1933 |
| 2,156,844 | Gautier | May 2, 1939 |